United States Patent [19]
Yamaguchi

[11] Patent Number: 5,107,155
[45] Date of Patent: Apr. 21, 1992

[54] VIBRATOR MOTOR FOR WIRELESS SILENT ALERTING DEVICE

[75] Inventor: Tadao Yamaguchi, Isesaki, Japan

[73] Assignee: Tokyo Parts Industrial Co., Ltd., Isesaki, Japan

[21] Appl. No.: 710,670

[22] Filed: Jun. 5, 1991

[30] Foreign Application Priority Data

Nov. 16, 1990 [JP] Japan ................... 2-309070

[51] Int. Cl.$^5$ ................... H02K 7/075; G08B 5/24; H04M 11/02
[52] U.S. Cl. ................... 310/81; 310/90; 340/311.1; 340/407; 384/255
[58] Field of Search ................... 310/81, 90, 265, 266; 340/407, 432, 457; 384/255

[56] References Cited

U.S. PATENT DOCUMENTS

| | | | |
|---|---|---|---|
| 3,911,416 | 10/1975 | Feder | 340/407 |
| 4,864,276 | 9/1989 | Tribbey et al. | 340/407 |
| 5,036,239 | 7/1991 | Yamaguchi | 310/81 |

Primary Examiner—Steven L. Stephan
Assistant Examiner—D. L. Rebsch
Attorney, Agent, or Firm—Hidaka and Benman

[57] ABSTRACT

A small dc vibrator motor for use in a wireless alerting device includes a housing, a non-rotatable shaft fixed to the housing, a cylindrical magnet fixedly mounted on the shaft, and a rotor which is rotatably mounted on the shaft. The rotor includes a cylindrical coreless winding assembly between the magnet and the housing, and eccentric bearings, or combinations of concentric bearings and eccentric weights, on both ends of the winding assembly. The eccentric bearings, or the combinations of concentric bearings and eccentric weights, cause vibrations when the rotor rotates.

28 Claims, 3 Drawing Sheets

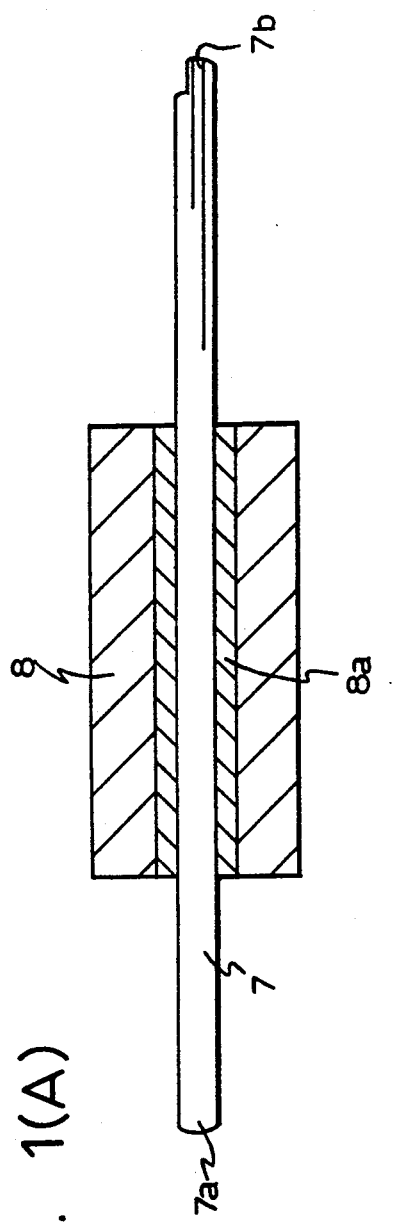
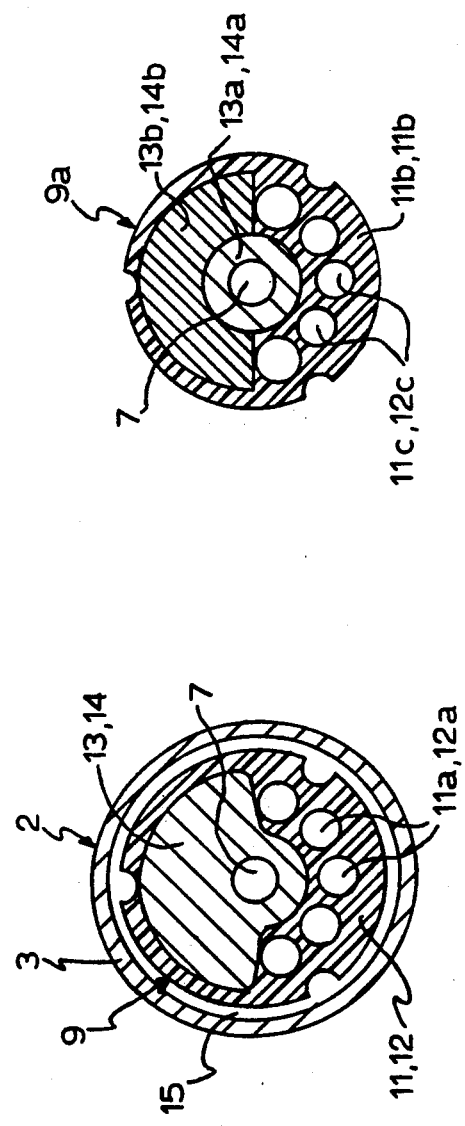
FIG. 1(A)
FIG. 2
FIG. 3

VIBRATOR MOTOR FOR WIRELESS SILENT ALERTING DEVICE

BACKGROUND OF THE INVENTION

1. FIELD OF THE INVENTION

This invention relates to a small-size coreless dc vibrator motor for use in a wireless silent alerting device. The alerting device is vibrated by the vibrator motor upon receiving a radio call signal and transmits the vibration to the wearer of the device so that the wearer becomes aware that he is being called without being noticed by others and, therefore, without disturbing others.

2. DESCRIPTION OF THE PRIOR ART

FIG. 5 shows one of the conventional small-size vibrator motors. In FIG. 5, letter M denotes a cylindrical dc motor which has a rotatable output shaft denoted by letter S. Letter W denotes an eccentric weight and mounted on the shaft S. The motor vibrates as the shaft turns because of the eccentric and unbalanced mass distribution about the axis of the shaft S.

Such a conventional vibrator motor having an eccentric weight on the rotatable shaft, however, requires an extra length of the shaft on which the weight is mounted and an additional space for the weight to occupy for rotation. The weight is normally made of a high density metal, such as a tungsten-based alloy, so as to create a maximum unbalanced centrifugal force out of a very small size eccentric weight. Since such a high density metal for the eccentric weight is very costly, the overall production cost of the vibrator motor has to be substantially increased because of the cost of the weight.

Furthermore, this type of conventional vibrator motor normally employs a cylindrical permanent magnet and a pair of bearings for holding the rotatable shaft. The bearings are normally disposed diametrically inside the cylindrical magnet. In case the bearings are made of an oil-impregnated iron, the bearings themselves can serve as magnetic paths. However, if the bearings are made of an oil-impregnated bronze-based alloy, which is not magnetically conductive but is typical as a bearing material, an iron tube has to be additionally disposed between the bearings and the inside periphery of the permanent magnet in order to provide magnetic paths.

On the other hand, it is desired that the radial thickness of the cylindrical permanent magnet is as large as practically possible. However, in the case of the above described conventional motor, the radial thickness of the cylindrical magnet has to be considerably curtailed not only because of the presence of the rotatable shaft and a clearance immediately around the shaft but also because of the additional room necessary for accommodating the bearings and the iron tube, if any; all of these are normally present diametrically inside the cylindrical magnet. Whereas the outside diameter of the cylindrical permanent magnet must naturally be limited because of the inevitable limit of the diameter of the motor which has to be made as small as possible.

The loss of the radial thickness of the cylindrical magnet gives rise to a decrease in the permeance at the operating point because the ratio of the radial thickness of the cylindrical magnet to the amount of the air gap (i.e. the distance between the outside periphery of the cylindrical magnet and the internal periphery of the case of the motor, wherein a cylindrical coreless winding assembly is disposed) is decreased. Accordingly, the effective magnetic flux density across the air gap is minimized and the cylindrical coreless winding assembly disposed therein is subjected to a less amount of magnetic flux, thereby causing the amperage for a required torque to be increased.

Furthermore, because the eccentric bearing is mounted on one end of the shaft, the bearing closer to the eccentric weight is subjected to a greater amount of unbalanced centrifugal force created by the eccentric weight and this gives rise to an accelerated wear to one bearing as compared to the wear to the other bearing, thereby shortening the life of the motor.

U.S. Pat. Nos. 3,623,064, issued Nov. 23, 1971, and 3,911,416, issued Oct. 7, 1975, disclose small motors for wireless silent paging devices having add-on unbalanced weights mounted on the output shafts. U.S. Pat. No. 4,030,246, issued July 5, 1977, discloses a comparatively large industrial vibrator motor including a rotor shaft having a pair of fixed eccentric weights and a pair of eccentric weights which are angularly adjustable about the rotor axis, so that the amount of the vibration of the motor can be controlled.

SUMMARY OF THE INVENTION

In view of the above, it is an object of the present invention to provide a small-size dc coreless vibrator motor for use in a wireless silent alerting device which requires neither an add-on eccentric weight nor an extended part of the rotor shaft on which the eccentric weight is mounted, thereby requiring no external space in which such eccentric weight rotates.

Another object of the present invention is to provide a small-size coreless vibrator motor for said use which features a simple construction, a low production cost, and yet requires low power consumption because of a greater permeance at the operating point.

A further object of the present invention is to provide a small-size coreless vibrator motor for said use having a pair of bearings which are subjected to a substantially equal amount of unbalanced centrifugal force, thereby obviating unbalanced wear between the two bearings, and consequently, extending the life of the motor.

The vibrator motor of the present invention includes a generally-cylindrically shaped housing; a non-rotatable shaft which is fixed to the housing; a cylindrically-shaped permanent magnet fixedly mounted directly or indirectly on the shaft; and a generally cylindrically-shaped rotor. The rotor includes a cylindrical coreless winding assembly disposed in an air gap formed between the magnet and the housing, a pair of holders disposed on both sides of the winding assembly, each holder containing an eccentric bearing mounted on the shaft, or a combination of a concentric bearing and an eccentric weight, and a commutator disposed at one end of the rotor. The motor further includes a pair of brushes slidably in contact with the commutator and fixed to a electrically-insulating brush base which also serves as a closure material on one side of the housing. More specifically, the housing consists of a case, having an open end and a closed end, the brush base which is fixedly attached to the case so as to close the open end thereof, a support-terminal which is securely attached, and electrically connected, to the closed end of the case, and a bracket-terminal which is rigidly secured to the brush base. The case and the bracket-terminal are electrically insulated from each other by the brush base. One of the brushes is electrically connected to the case and the other brush to the bracket-terminal. Thus, the support-terminal and the bracket-terminal serve as power input terminals, which can be directly connected to a power supply circuit on a circuit board.

This arrangement also obviates a possible mechanical damage to a power supply wiring which may be otherwise caused by the vibrations of the alerting device and further facilitates the fabrication of the alerting device in a mass production.

The pair of the eccentric bearings, or the eccentric weights, cause vibrations when the rotor is rotated. Since the eccentric bearings, or the eccentric weights, are completely contained in the rotor of the motor, no extra space external to the vibrator motor need to be considered in fitting the motor to the alerting device, as opposed to the case of a conventional vibrator motor having an external eccentric weight. This substantially facilitates the design of the alerting device which employs the vibrator motor. Furthermore, the radial thickness of the fixed cylindrical magnet can be made large, to increase the permeance at the operating point, thereby causing the required amount of current to be lowered and minimizing power consumption.

BRIEF DESCRIPTION OF THE DRAWINGS

FIG. 1A is a longitudinal vertical cross section showing a shaft-magnet assembly which can be alternatively used for the shaft-magnet assembly of the vibrator motor shown in FIG. 1

FIG. 2 is a vertical cross section of the vibrator motor taken along the lines II—II or II'—II' of FIG. 1.

FIG. 3 is a cross section of a rotor of a second embodiment of a coreless dc vibrator motor according to the present invention.

DETAILED DESCRIPTION OF THE PREFERRED EMBODIMENTS

Figure 1:
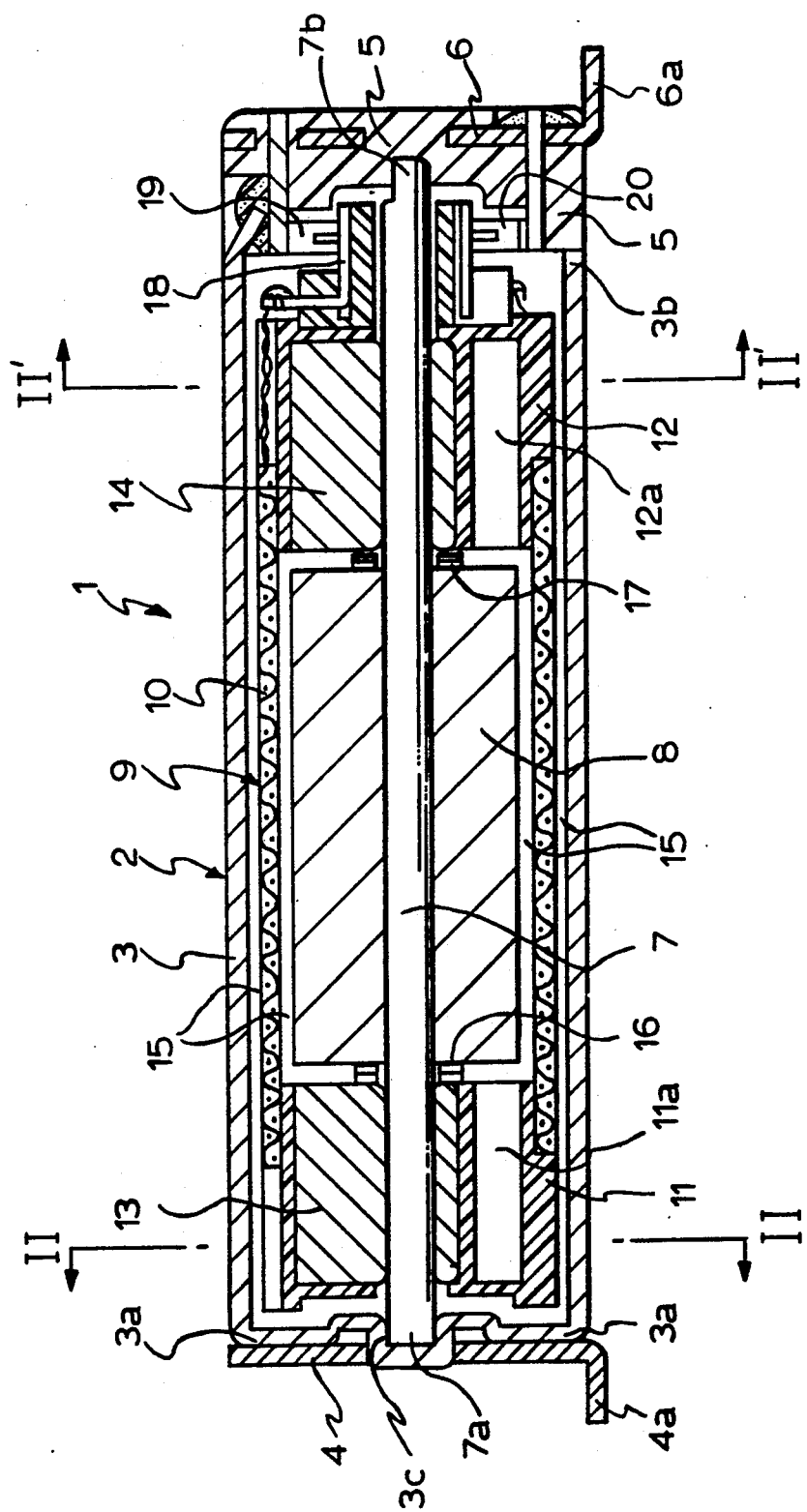
FIG. 1 is a longitudinal vertical cross section of one embodiment of a coreless dc vibrator motor according to the present invention.

FIG. 1 is a longitudinal cross section of one embodiment of a coreless dc vibrator motor according to the present invention. A vibrator motor 1 has a generally cylindrically-shaped housing 2 which consists of a generally cylindrically-shaped case 3, a support-terminal 4, a brush base 5, and a bracket-terminal 6. The case 3 is made of an electrically-magnetically-conductive material: i.e. tinplate, in this embodiment. One end 3a (the left-side end as viewed in FIG. 1) of the case 3 per se is closed and the other end 3b thereof is open.

Figure 4:
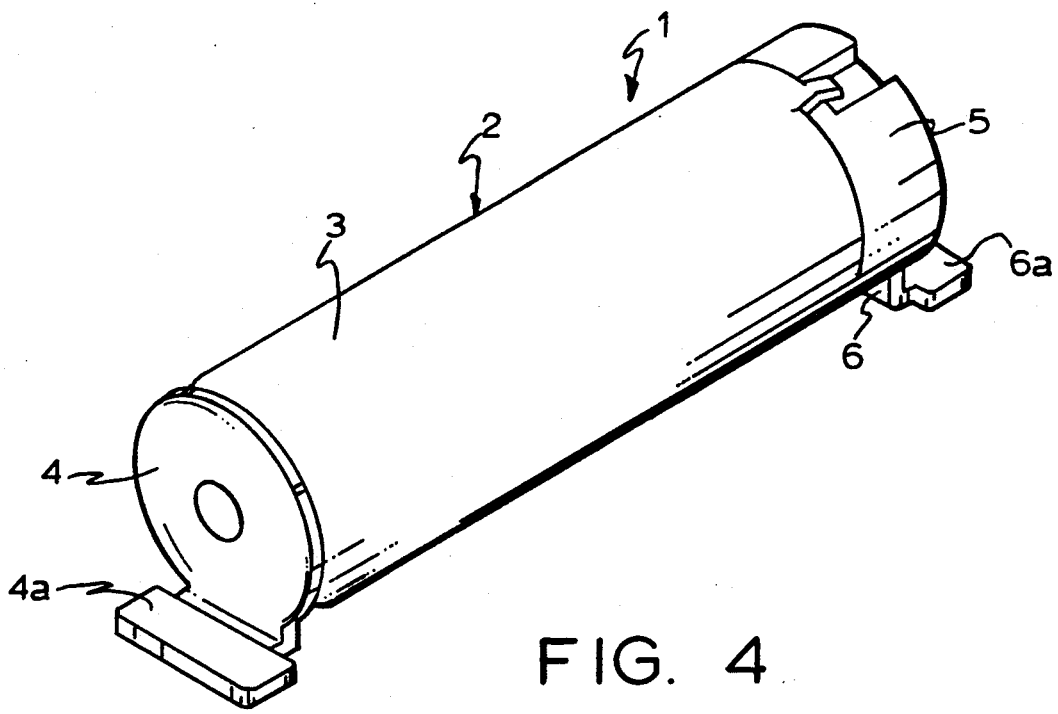
FIG. 4 is a perspective external view of the vibrator motor as shown in FIG. 1.
Figure 5:
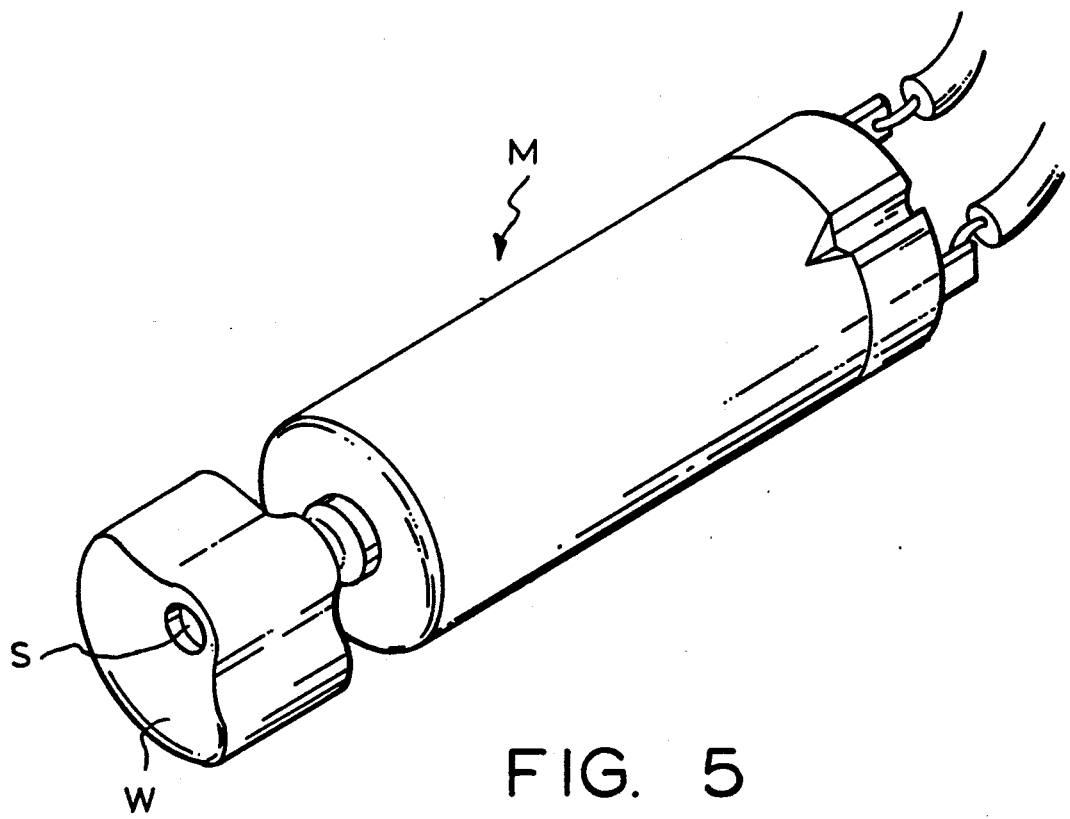
FIG. 5 is a perspective external view of a conventional vibrator motor having an eccentric weight mounted on the rotor shaft.

Referring to FIGS. 1 and 4, the support-terminal 4 is electrically-conductive and is securely attached to the closed end 3a of the case 3. The brush base 5, made of an electrically-insulating synthetic resin, is securely fixed to the case 3 in such a manner that the brush base 5 caps and closes the open end 3b of the case 3. The bracket-terminal 6 is electrically-conductive and is rigidly attached to the brush base 5, so that the bracket-terminal 6 and the case 3 are fixedly held together, but electrically insulated from each other, by the brush base 5.

Referring to FIG. 1, numeral 7 denotes a non-rotatable shaft made of a magnetically-conductive metal: i.e. magnetically-conductive stainless steel (SUS420J2), in this embodiment. One end 7a of the shaft 7 is fixedly engaged with a bore 3c formed in the diametrical center of the end 3a of the case 3. The other end 7b of the shaft 7 is fixed to the brush base 5 in a diametrical center of the housing 2. The end 7b of the shaft 7 has a D-shaped section so that the shaft 7 is securely locked to the brush base 5 and is prevented from accidental rotation. The D-shaped end 7b of the shaft 7 is also utilized for the purpose of obtaining a precise angular alignment of the shaft 7 in the course of production. A cylindrically-shaped permanent magnet 8, made of a rare earth metal, is fixedly mounted on the shaft 7. The magnet 8 may be formed in a segmented construction.

FIG. 1A shows a shaft-magnet assembly in longitudinal vertical cross section which can be alternatively used for the shaft-magnet assembly of the vibrator motor shown in FIG. 1. In FIG. 1A, a magnetically-conductive tube 8a is fixedly mounted on the shaft 7 and the permanent magnet 8 is fixedly mounted on the magnetically-conductive tube 8a. In other words, the magnetically conductive tube 8a is fixedly interposed between the shaft 7 and the magnet 8. The magnetically-conductive tube 8a serves as a path for magnetic flux. Therefore, the shaft 7 may be made magnetically non-conductive in this alternative embodiment as explained later.

Referring back to FIG. 1, rotor 9 includes a cylindrically-shaped coreless winding assembly 10 and a pair of holders 11 and 12 which are made of light-weight epoxy resin and disposed on both sides of the winding assembly 10 and securely fixed thereto. A pair of oil-impregnated eccentric bearings 13 and 14, made of a bronze-based alloy, are disposed in the holders 11 and 12, respectively, and securely fixed thereto. The bearings 13 and 14 are rotatably mounted on the shaft 7 so that the rotor 9 is rotatable about the axis of the shaft 7 while the shaft 7 and the magnet 8 remain stationary. Although the bearings 13 and 14 are eccentric in terms of their mass distributions about the axis of the shaft 7, the winding assembly 10 and the magnet 8 are concentrically disposed with respect to the axis of the shaft 7 so that the winding assembly 10 stays in an air gap 15 formed between the circumferential surface of the magnet 8 and the inner circumferential surface of the case 3. Spacers 16, 17 are disposed on both sides of the magnet 8 in order to prevent a longitudinal (axial) movement of the rotor 9.

FIG. 2 is a cross section of the vibrator motor 1 taken along the lines II—II or II'—II' of FIG. 1.

In reference to FIGS. 1 and 2, the eccentric bearings 13 and 14 have a generally fan-shaped cross section, as shown in FIG. 2, in a plane perpendicular to the axis of the shaft 7, and are press-fit or otherwise fixedly secured to the holders 11 and 12, respectively. The centers of mass (or, the centers of gravity) of the eccentric bearings 13 and 14 are off the axis of the shaft 7. Each of the bearings 13 and 14 is so designed and formed that the deviation of the center of mass thereof from the axis of the shaft 7 is as large as practically possible so as to create a maximum unbalanced centrifugal force, yet the distance between the outermost part thereof and the axis of the shaft may not exceed the outside radius of the magnet 8. Therefore, the distance from the axis of the shaft 7 to a radially farthest part of each of the eccentric bearings 13 and 14 is substantially equal to the outside radius of the cylindrical magnet 8.

As shown in FIGS. 1 and 2, the holders 11 and 12 have air spaces 11a and 12a, respectively, on the opposite side of the centers of mass of the eccentric bearings 13 and 14, respectively, with respect to the axis of the shaft 7 so that the centers of the total masses of the holders 11, 12 and the bearings 13, 14, respectively, are effectively away from the axis of the shaft 7.

In this embodiment, the centers of mass of the eccentric bearing 13 and the eccentric bearing 14 are angularly aligned to each other about the axis of the shaft 7 within a tolerance of + 10 degrees so that the unbalanced centrifugal forces created by the bearings 13 and 14, when the rotor 9 is rotated, are always directed in angularly the same direction. Such angular alignment between the bearings 13 and 14 is effective in creating maximum vibrations to be felt by the wearer of the alerting device for a given power input to the motor 1.

The air spaces 11a, 12a are a plurality of longitudinally (axially) elongated columnar holes as shown in FIGS. 1 and 2 and the respective holes are angularly aligned to each other between the holders 11 and 12. Conversely, the air spaces 11a, 12a can also be utilized for obtaining an angular alignment between the holders 11 and 12 in the production of the motor 1. The construction and the arrangement of the components of the rotor 9 are in order for maximizing the vibration of the alerting device with limited dimensions, weight and power consumption and for ensuring the reception of the vibration by the wearer of the alerting device.

FIG. 3 shows a cross section of a rotor of a vibrator motor of the second embodiment according to the present invention. A rotor 9a of the second embodiment has a similar construction to that of the rotor 9 of the first embodiment described above except that the eccentric bearings 13 and 14 of the first embodiment are replaced by combinations of oil-impregnated concentric bearings 13a and 14a, respectively, made of a bronze-based alloy, and eccentric weights 13b and 14b, respectively, made of a high density metal such as lead. The concentric bearings 13a, 14a and the eccentric weights 13b, 14b are securely held in the holders 11b and 12b, respectively, and the concentric bearings 13a, 14a are rotatably mounted on the shaft 7. The eccentric weights 13b and 14b have a generally fan-shaped cross section, as shown in FIG. 3, in a plane perpendicular to the axis of the shaft 7. The eccentric weights 13b and 14b are eccentric in terms of their mass distributions about the axis of the shaft 7. Therefore, the center of the mass (the center of gravity) of each of the eccentric weights 13b, 14b is off the axis of the shaft 7 so that the eccentric weights 13b, 14b cause vibrations when the rotor is rotated.

The distance from the axis of the shaft 7 to a radially farthest part of each of the eccentric weights 13b and 14b is substantially equal to the outside radius of the cylindrical magnet 8, as is the case of the eccentric bearings 13, 14 in the first embodiment.

The holders 11b and 12b of the second embodiment also contain air spaces 11c and 12c, respectively, on the opposite side of the centers of mass of the eccentric weights 13b and 14b, respectively, with respect to the axis of the shaft 7 so that the centers of the total masses of the holder 11b and the eccentric weight 13b and the holder 12b and the eccentric weight 14b, respectively, are effectively away from the axis of the shaft 7.

In the second embodiment, the centers of mass of the eccentric weight 13b and the eccentric weight 14b are angularly aligned to each other about the axis of the shaft 7 within a tolerance of ± 10 degrees so that the unbalanced centrifugal forces created by the eccentric weights 13b, 14b, when the rotor 9a is rotated, are always directed in angularly the same direction. The air spaces 11c and 12c are angularly aligned to each other about the axis of the shaft 7, as is the case of the first embodiment.

The construction of other parts of the vibrator motor of the second embodiment is identical to that of the vibrator motor of the first embodiment.

In both of the first and the second embodiments, the permanent magnet 8 may be a rare-earth-element-based plastic magnet (i.e. bonded magnet) which is directly formed onto the shaft 7 or onto the magnetically-conductive tube 8a shown in FIG. 1A.

Referring again to FIG. 1, a commutator 18 is concentrically disposed with respect to the axis of the shaft 7 and is fixedly secured to the holder 12 and electrically connected to the winding assembly 10. A pair of brushes 19 and 20, which are slidably in contact with the commutator 18, are fixedly secured to the brush base 5 and electrically connected to the case 3 and the bracket-terminal 6, respectively. Therefore, a dc power to drive the vibrator motor 1 can be input between the support-terminal 4 and the bracket-terminal 6.

In reference to FIGS. 1 and 4, bases 4a and 6a of the support-terminal 4 and bracket-terminal 6, respectively, can be directly connected to a dc power supply circuit on a circuit board. As a matter of course, power input to the motor 1 may alternatively be achieved in a conventional lead-wire method.

In the above embodiments, each of the winding assembly 10 and the commutator 18 is made up of three segments (120 degrees each), and the permanent magnet 8 is made up of two segments (180 degrees each). The loop of the magnetic circuit is: an outside periphery (N pole) of the magnet—an air gap (including the winding assembly)—case (the magnetic flux passes in the case angularly 180 degrees)—another air gap (including the winding assembly) on the 180-degree opposite side—another outside periphery (S pole) of the magnet on the 180-degree opposite side—inside the magnet—magnetically conductive shaft—inside the magnet—the outside periphery (N pole) of the magnet.

In the alternative embodiment of the shaft-magnet assembly as shown in FIG. 1A, the shaft 7 may be magnetically non-conductive. In that case, the magnetic flux passes through the magnetically-conductive tube 8a while bypassing the shaft 7.

The dc currents input to the winding assembly 10 through the input route of support-terminal 4—case 3—brush 19—commutator 18—winding assembly 10 and output from the winding assembly 10 through the output route of winding assembly 10—commutator 18—brush 20—bracket-terminal 6, or vice versa. Then, according to Fleming's left-hand rule, the dc-current-carrying winding assembly 10 electromagnetically interacts with the magnetic flux which is present across the air gap 15 between the magnet 8 and the case 3, thereby causing the rotor 9 to rotate. As the rotor 9 rotates, the eccentric bearings 13, 14, in the first embodiment, or the eccentric weights 13b, 14b, in the second embodiment, cause vibrations. The vibrations are transmitted from the motor 1 to the alerting device, and then to the wearer of the device.

In an alternative embodiment, the winding assembly 10 and the commutator 18 may be made up of six segments (60 degrees each), and the magnet 8 may be made up of four segments (90 degrees each). However, the basic principle of producing electromagnetic force is the same as above.

Since the rotor of the vibrator motor according to the present invention contains a pair of holders, and each of the holders has an eccentric bearing, or a combination of a concentric bearing and an eccentric weight, in order to produce vibrations, and all of the bearings or the weights are disposed completely within the rotor, no space external to the vibrator motor need to be considered in designing the alerting device which contains the vibrator motor.

Furthermore, the eccentric bearings may be made of the same material as is used for conventional bearings and such material is far less costly as compared to the material, such as tungsten alloys, of external eccentric weights used in the conventional vibrator motors. In addition, the radial thickness of the fixed cylindrical magnet can be made large enough so as to increase the permeance at the operating point, thereby causing the amount of the current to be lowered and the power requirement to be minimized.

It will be understood that various changes and modifications may be made in the above described embodiments which provide the characteristics of the present invention without departing from the spirit and principle thereof particularly as defined in the following claims.

What is claimed is:

1. A dc vibrator motor for use in a wireless silent alerting device, comprising:
    (a) a housing including a electrically-magnetically-conductive case;
    (b) a magnetically-conductive shaft which is non-rotatably fixed to said housing;
    (c) a cylindrical permanent magnet fixedly mounted on said shaft;
    (d) a rotor which is rotatably mounted on said shaft, said rotor including:
        a cylindrically-shaped coreless winding assembly having a first end and a second end, said coreless winding assembly being disposed in an air gap formed between said housing and said permanent magnet,
        a first holder fixedly attached to said winding assembly on the first end thereof, said first holder having a first lubricant-containing eccentric bearing rotatably mounted on said shaft, and
        a second holder fixedly attached to said winding assembly on the second end thereof, said second holder having a second lubricant-containing eccentric bearing rotatably mounted on said shaft, the center of mass of each of said first and second eccentric bearings being off the axis of said shaft so that said first and second bearings cause vibrations when said rotor is rotated; and
    (e) means for supplying dc currents to said winding assembly.

2. A dc vibrator motor according to claim 1, wherein said first and second holders further contain a first air space and a second air space, respectively, on the opposite side of the centers of mass of said first and second eccentric bearings, respectively, with respect to the axis of said shaft so that the centers of total masses of said first holder and said first eccentric bearing and said second holder and said second eccentric bearing, respectively, are effectively away from the axis of said shaft.

3. A dc vibrator motor according to claim 1, wherein the centers of mass of said first eccentric bearing and said second eccentric bearing are angularly aligned to each other about the axis of said shaft within a tolerance of ± 10 degrees so as to maximize the effect of the vibrations.

4. A dc vibrator motor according to claim 1, wherein the distance from the axis of said shaft to a radially farthest part of each of said first eccentric bearing and said second eccentric bearing is substantially equal to the outside radius of said cylindrical magnet.

5. A dc vibrator motor according to claim 1, wherein a section in a plane perpendicular to the axis of said shaft of each of said first and second eccentric bearings is generally fan-shaped.

6. A dc vibrator motor according to claim 1, wherein said housing further includes a brush base, and said means for supplying dc currents comprises:
    a first terminal securely attached to one end of said case of said housing, and
    a second terminal rigidly attached to said brush base of said housing, so that said first and second terminals are disposed on one end and the other end, respectively, of said housing so as to support said housing,
    said first and second terminals having respective bases which can be connected to a dc power supply circuit on a circuit board.

7. A dc vibrator motor according to claim 1, wherein said permanent magnet is a rare-earth-element-based plastic magnet which is directly formed onto said shaft.

8. A dc vibrator motor for use in a wireless silent alerting device, comprising:
    (a) a housing including a electrically-magnetically-conductive case;
    (b) a magnetically-conductive shaft which is non-rotatably fixed to said housing;
    (c) a cylindrical permanent magnet fixedly mounted on said shaft;
    (d) a rotor which is rotatably mounted on said shaft, said rotor including:
        a cylindrically-shaped coreless winding assembly having a first end and a second end said coreless winding assembly being disposed in an air gap formed between said housing and said cylindrical permanent magnet,
        a first holder fixedly attached to said winding assembly on the first end thereof, said first holder having a first lubricant-containing concentric bearing rotatably mounted on said shaft and a first eccentric weight, and
        a second holder fixedly attached to said winding assembly on the second end thereof, said second holder having a second lubricant-containing concentric bearing rotatably mounted on said shaft and a second eccentric weight, the center of mass of each of said first and second eccentric weights being off the axis of said shaft so that said first and second eccentric weights cause vibrations when said rotor is rotated; and
    (e) means for supplying dc currents to said winding assembly.

9. A dc vibrator motor according to claim 8, wherein said first and second holders further contain a first air space and a second air space, respectively, on the opposite side of the centers of mass of said first and second eccentric weights, respectively, with respect to the axis of said shaft so that the centers of total masses of said first holder and said first eccentric weight and said second holder and said second eccentric weight, respectively, are effectively away from the axis of said shaft.

10. A dc vibrator motor according to claim 8, wherein the centers of mass of said first eccentric weight and said second eccentric weight are angularly aligned to each other about the axis of said shaft within a tolerance of ± 10 degrees so as to maximize the effect of the vibrations.

11. A dc vibrator motor according to claim 8, wherein the distance from the axis of said shaft to a radially farthest part of each of said first eccentric weight and said second eccentric weight is substantially equal to the outside radius of said cylindrical magnet.

12. A dc vibrator motor according to claim 8, wherein a section in a plane perpendicular to the axis of said shaft of each of said first and second eccentric weights is generally fan-shaped.

13. A dc vibrator motor according to claim 8, wherein said housing further includes a brush base, and said means for supplying dc currents comprises:
 a first terminal securely attached to one end of said case of said housing, and
 a second terminal rigidly attached to said brush base of said housing, so that said first and second terminals are disposed on one end and the other end, respectively, of said housing so as to support said housing,
 said first and second terminals having respective bases which can be connected to a dc power supply circuit on a circuit board.

14. A dc vibrator motor according to claim 8, wherein said permanent magnet is a rare-earth-element-based plastic magnet which is directly formed onto said shaft.

15. A dc vibrator motor for use in a wireless silent alerting device, comprising:
 (a) a housing including a electrically-magnetically-conductive case;
 (b) a shaft which is non-rotatably fixed to said housing;
 (c) a magnetically-conductive tube fixedly mounted on said shaft;
 (d) a cylindrical permanent magnet fixedly mounted on said magnetically-conductive tube;
 (e) a rotor which is rotatably mounted on said shaft, said rotor including:
 a cylindrically-shaped coreless winding assembly having a first end and a second end, said coreless winding assembly being disposed in an air gap formed between said housing and said permanent magnet,
 a first holder fixedly attached to said winding assembly on the first end thereof, said first holder having a first lubricant-containing eccentric bearing rotatably mounted on said shaft, and
 a second holder fixedly attached to said winding assembly on the second end thereof, said second holder having a second lubricant-containing eccentric bearing rotatably mounted on said shaft, the center of mass of each of said first and second eccentric bearings being off the axis of said shaft so that said first and second bearings cause vibrations when said rotor is rotated; and
 (f) means for supplying dc currents to said winding assembly.

16. A dc vibrator motor according to claim 15, wherein said first and second holders further contain a first air space and a second air space, respectively, on the opposite side of the centers of mass of said first and second eccentric bearings, respectively, with respect to the axis of said shaft so that the centers of total masses of said first holder and said first eccentric bearing and said second holder and said second eccentric bearing, respectively, are effectively away from the axis of said shaft.

17. A dc vibrator motor according to claim 15, wherein the centers of mass of said first eccentric bearing and said second eccentric bearing are angularly aligned to each other about the axis of said shaft within a tolerance of ± 10 degree so as to maximize the effect of the vibrations.

18. A dc vibrator motor according to claim 15, wherein the distance from the axis of said shaft to a radially farthest part of each of said first eccentric bearing and said second eccentric bearing is substantially equal to the outside radius of said cylindrical magnet.

19. A dc vibrator motor according to claim 15, wherein a section in a plane perpendicular to the axis of said shaft of each of said first and second eccentric bearings is generally fan-shaped.

20. A dc vibrator motor according to claim 15, wherein said housing further includes a brush base, and said means for supplying dc currents comprises:
 a first terminal securely attached to one end of said case of said housing, and
 a second terminal rigidly attached to said brush base of said housing, so that said first and second terminals are disposed on one end and the other end, respectively, of said housing so as to support said housing,
 said first and second terminals having respective bases which can be connected to a dc power supply circuit on a circuit board.

21. A dc vibrator motor according to claim 15, wherein said permanent magnet is a rare-earth-element-based plastic magnet which is directly formed onto said magnetically-conductive tube.

22. A dc vibrator motor for use in a wireless silent alerting device, comprising:
 (a) a housing including a electrically-magnetically-conductive case;
 (b) a shaft which is non-rotatably fixed to said housing;
 (c) a magnetically-conductive tube fixedly mounted on said shaft;
 (d) a cylindrical permanent magnet fixedly mounted on said magnetically-conductive tube;
 (e) a rotor which is rotatably mounted on said shaft, said rotor including:
 a cylindrically-shaped coreless winding assembly having a first end and a second end, said coreless winding assembly being disposed in an air gap formed between said housing and said cylindrical permanent magnet,
 a first holder fixedly attached to said winding assembly on the first end thereof, said first holder having a first lubricant-containing concentric bearing rotatably mounted on said shaft and a first eccentric weight, and
 a second holder fixedly attached to said winding assembly on the second end thereof, said second holder having a second lubricant-containing concentric bearing rotatably mounted on said shaft and a second eccentric weight, the center of mass of each of said first and second eccentric weights being off the axis of said shaft so that said first and second eccentric weights cause vibrations when said rotor is rotated; and (f) means for supplying dc currents to said winding assembly.

23. A dc vibrator motor according to claim 22, wherein said first and second holders further contains a first air space and a second air space, respectively, on the opposite side of the centers of mass of said first and second eccentric weights, respectively, with respect to the axis of said shaft so that the centers of total masses of said first holder and said first eccentric weight and said second holder and said second eccentric weight, respectively, are effectively away from the axis of said shaft.

24. A dc vibrator motor according to claim 22, wherein the centers of mass of said first eccentric weight and said second eccentric weight are angularly aligned to each other about the axis of said shaft within a tolerance of ± 10 degrees so as to maximize the effect of the vibrations.

25. A dc vibrator motor according to claim 22, wherein the distance from the axis of said shaft to a radially farthest part of each of said first eccentric weight and said second eccentric weight is substantially equal to the outside radius of said cylindrical magnet.

26. A dc vibrator motor according to claim 22, wherein a section in a plane perpendicular to the axis of said shaft of each of said first and second eccentric weights is generally fan-shaped.

27. A dc vibrator motor according to claim 22, wherein said housing further includes a brush base, and said means for supplying dc currents comprises:

a first terminal securely attached to one end of said case of said housing, and a second terminal rigidly attached to said brush base of said housing, so that said first and second terminals are disposed on one end and the other end, respectively, of said housing so as to support said housing, said first and second terminals having respective bases which can be connected to a dc power supply circuit on a circuit boards.

28. A dc vibrator motor according to claim 22, wherein said permanent magnet is a rare-earth-element-based plastic magnet which is directly formed onto said magnetically-conductive tube.

* * * * *